(12) United States Patent
Yamaguchi (10) Patent No.: US 7,609,360 B2
(45) Date of Patent: Oct. 27, 2009

(54) IMAGE DISPLAY DEVICE (75) Inventor: Akira Yamaguchi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 10/462,674

(22) Filed: Jun. 17, 2003

(65) Prior Publication Data
US 2003/0231161 A1 Dec. 18, 2003

(30) Foreign Application Priority Data
Jun. 17, 2002 (JP) ............... 2002-175685

(51) Int. Cl.
G02F 1/13 (2006.01)
(52) U.S. Cl. .......................... 349/199; 349/1
(58) Field of Classification Search ............... 349/199, 349/1, 61–71; 345/77, 102
See application file for complete search history.

(56) References Cited

U.S. PATENT DOCUMENTS

| 5,675,357 | A | * | 10/1997 | Yoshida et al. ............... 345/104 |
| 5,818,553 | A | * | 10/1998 | Koenck et al. ................. 349/61 |
| 5,850,205 | A | | 12/1998 | Blouin |
| 5,999,237 | A | * | 12/1999 | Miyawaki ..................... 349/57 |
| 6,087,648 | A | * | 7/2000 | Zhang et al. .............. 250/208.1 |
| 6,144,359 | A | * | 11/2000 | Grave .......................... 345/102 |
| 6,188,380 | B1 | | 2/2001 | Kawashima et al. |
| 7,030,551 | B2 | * | 4/2006 | Yamazaki et al. ............ 313/498 |
| 2002/0150293 | A1 | | 10/2002 | Kagawa et al. |
| 2002/0163601 | A1 | | 11/2002 | Min et al. |
| 2003/0063784 | A1 | | 4/2003 | Ono |
| 2003/0067476 | A1 | | 4/2003 | Miller et al. |

* cited by examiner

Primary Examiner—Dung T. Nguyen
(74) Attorney, Agent, or Firm—Sughrue Mion, PLLC (57) ABSTRACT The image display device includes a liquid crystal panel which has at least one optical sensor for outputting an electric signal resulting from light irradiation, pixel electrodes for driving a liquid crystal, switching elements for switching the pixel electrodes and a single transparent substrate on which the at least one optical sensor, the pixel electrodes and the switching elements are formed by laminating thin films.

4 Claims, 9 Drawing Sheets

IMAGE DISPLAY DEVICE

BACKGROUND OF THE INVENTION

1. Field of the Invention

The present invention belongs to a technical field of an image display device and in particular a medical image display device for displaying an image photographed by a medical diagnostic apparatus or the like. More particularly, the present invention relates to a medical image display device capable of displaying a plurality of medical images arranged in a row as visible images.

2. Description of the Related Art

A medical image photographed (measured) by a medical diagnostic apparatus such as an ultrasonic diagnostic apparatus, a CT diagnostic apparatus, an MRI diagnostic apparatus, an X-ray diagnostic apparatus, or a CR apparatus including an FCR (Fuji computed radiography) is subjected to various image processing operations as required. After that, generally, the medical image is reproduced as a visible image on a film-shaped recording material by a printer such as a laser printer or a thermal printer and outputted as a hard copy.

On a medical site, the film on which the medical image is reproduced is observed using a light box called Schaukasten, and is used for various diagnoses.

Also, in recent years, the diagnosis has been conducted by reproducing as a soft copy the medical image photographed by the medical diagnostic apparatus on a display device such as a CRT (cathode ray tube) or a liquid crystal display. In addition, such a diagnosis has come to be conducted, in which a work station for diagnosis provided with a CRT is connected to the medical diagnostic apparatus through a network, and the diagnosis is conducted through observing the photographed medical image in a consulting room or the like which is located apart from the medical diagnostic apparatus.

Also, more recently, a thin type liquid crystal display can attain high quality image display. As a result, the liquid crystal display has been increasingly used instead of the CRT in various display fields. In the liquid crystal display, light emitted from a backlight is made incident on a liquid crystal, and a voltage applied to the liquid crystal is changed for each corresponding pixel in accordance with image data. Thus, the transmittance of light passing through the liquid crystal is changed to display an image on a surface side thereof.

In particular, in a liquid crystal display for medical use including medical diagnosis, a cold cathode fluorescent lamp (CCFL) is used as a backlight. The CCFL functions on the principle that the luminance can be controlled based on the adjustment of a ramp current value. In addition, for the CCFL, there are a direct type structure and an edge light structure.

A plurality of shapes are used for the direct type CCFL, which may be a straight tube, a U-shaped tube, a W-shaped tube, or the like. The direct type CCFL is located immediately under a display region surface of an array substrate in which a liquid crystal is sealed and has a structure in which a liquid crystal in the display region is directly irradiated with light. Note that a light curtain and a diffusing plate are attached onto the upper surface of the direct type CCFL to reduce luminance unevenness.

According to the direct type CCFL, because the liquid crystal in the display region is directly irradiated with light, the amount of light can be efficiently utilized, so that high luminance can be achieved easily. Therefore, such a structure is the mainstream particularly in image display on a film viewer (so-called electronic film viewer) used in the medical field that requires high luminance. In other words, a liquid crystal display on which the direct type CCFL is mounted is more appropriate for obtaining high luminance than a liquid crystal display on which an edge light type CCFL to be described later is mounted. Therefore, the former is very often used for the film viewer in the medical field.

On the other hand, for the edge light type CCFL, a straight tube, a U-shaped tube, an L-shaped tube, or the like is used. The edge light type CCFL is located in the edge of a light guide plate opposed to the liquid crystal in the display region and has a structure in which the liquid crystal in the display region is indirectly irradiated with light through the light guide plate. Note that a reflector for condensing reflected light to the light guide plate is disposed near the CCFL. In addition, a reflecting sheet for reflecting incident light from the edge to the liquid crystal in the display region is provided in the light guide plate.

A liquid crystal display on which the edge light type CCFL is mounted can also be used for the film viewer (electronic film viewer) in the medical field by increasing the luminance of light emitted from the CCFL itself.

Here, in order to conduct further accurate diagnosis in medical examination and treatment using the medical diagnostic apparatus, it is general that a large number of images are photographed for each diagnosis while changing a photographing condition, a photographing angle, and a photographing region. In general diagnosis using the film viewer, a plurality of films on which the thus photographed medical images are reproduced, are arranged on the film viewer and the diagnosis is conducted through observing and comparing the respective images.

However, when a plurality of medical images photographed by the medical diagnostic apparatus are displayed on a plurality of CRTs or liquid crystal displays to conduct the diagnosis, it is general that one image is displayed on the screen of a CRT or the screen of a liquid crystal display. Accordingly, the luminance must be adjusted for each CRT or each liquid crystal display.

In particular, in a liquid crystal display on which the direct type CCFL is mounted, a plurality of light emitting tubes are disposed for the liquid crystal in the display region. Therefore, if the amounts of light of the respective light emitting tubes are not uniform, luminance unevenness is caused. The thus caused luminance unevenness is a serious problem leading to a false diagnosis particularly in the medical field, so that the luminance unevenness should be rapidly compensated for. In addition, in any of the direct type CCFL and the edge light type CCFL, the reduction in luminance causes a problem in that an image is hard to view and so on, which leads to a false diagnosis. Accordingly, it is necessary to keep adequately high luminance.

The luminance unevenness has been conventionally adjusted by measurement using a luminance meter for each case. This is inconvenient because a luminance meter is necessary for each case. Therefore, a hole is formed on the rear side of the liquid crystal display to locate an optical sensor so that the luminance of a backlight may be measured. Alternatively, an optical sensor is located in the front side of the liquid crystal display, with which the luminance may be measured.

However, when the hole is formed on the rear side of the liquid crystal display, the hole causes the luminance unevenness. In addition, when the optical sensor is located on the front side of the liquid crystal display, a space for the optical sensor is necessary, which causes a problem in that a screen view is blocked.

In the case of a diagnosis using an image reproduced on a film, the image is fixed on the film and hence the diagnosis can be basically conducted by observing the single image, although certain differences may occur due to the luminance of a film viewer used or observation environment.

On the other hand, when conducting the diagnosis using an image displayed on a display device such as a CRT or a liquid crystal display, the displayed image, that is, the diagnostic image is changed by the type, state and aging of a display device used, because it is image data that is fixed thereon. Such a difference in the image causes a serious problem which may lead to a false diagnosis. Therefore, the quality control (QC) for appropriately retaining the state of a display device used is important when conducting diagnosis using the display device.

Various test items including observation condition, (luminance) gradation properties, spatial resolution and geometry are set for the quality control of display devices. The important measurement for conducting these tests is the measurement of luminance such as maximum luminance and minimum luminance of a display device, and surface reflection luminance of a display device in association with peripheral light.

An exterior luminance meter must be used to measure the luminance, which is laborious. In particular, the high-accuracy luminance measurement requires the use of a telescopic luminance meter, which is however expensive and is not easy to handle. A contact type luminance meter is known as the meter capable of simple luminance measurement but luminance cannot be appropriately measured in the contact type luminance meter because a displayed image is changed when a force is applied to the image display screen of a liquid crystal display, which is well known in the art.

Further, it is necessary to measure the surface reflection luminance under observation conditions using a telescopic luminance meter when quality control is performed according to DICOM (Digital Imaging and Communications in Medicine; transmission standard of medical image data, waveform data and the like), which makes the quality control work of a display device complicated.

SUMMARY OF THE INVENTION

A first object of the present invention is, therefore, to solve the above-mentioned problems inherent in the related art, and to provide an image display device in which a screen view is not obstructed by an optical sensor for measuring luminance unevenness of a liquid crystal panel which is caused by a service life of a backlight, and which is capable of down sizing and easy measurement of environmental light (exterior light) and light from the backlight.

A second object of the present invention is to provide an image display device which meets the first object described above and is also capable of simple measurement of surface reflection luminance, maximum luminance and minimum luminance without using any exterior luminance meter, thus enabling significant improvement of the workability for the quality control of display devices, and in particular a device and a system for medical image display which are capable of easy display quality control of medical images.

In order to achieve the above-mentioned objects, according to the present invention, there is provided an image display device which includes a liquid crystal panel, the liquid crystal panel comprising: at least one optical sensor for outputting an electric signal resulting from light irradiation; pixel electrodes for driving a liquid crystal; switching elements for switching the pixel electrodes; and a single transparent substrate on which the at least one optical sensor, the pixel electrodes and the switching elements are formed by laminating thin films.

The at least one optical sensor and the switching elements are preferably formed by using an identical material.

The term "identical material" used herein means that a semiconductor serving as a substrate which includes no dopant for producing a p-type or n-type semiconductor is the same so that pn-junction portions in the optical sensor and the switching elements (TFTs) can be formed by laminating thin films without greatly increasing the number of steps. It is preferable that amorphous silicon or polycrystalline silicon is used as the identical material.

In a preferred embodiment, the image display device of the present invention further includes a control section for monitoring an output from the at least one optical sensor.

Besides, the image display device may further include display means for displaying on a monitor a measurement result obtained by the optical sensor or voice output means for outputting a voice indicating the measurement result. In addition, the control section, the display means, and the voice output means may be provided in the image display device or on the side of an image display system (e.g., electronic film viewer system in medical image display) on which the image display device is mounted.

It is preferable that the at least one optical sensor can detect at least one of light emitted from a backlight located on a rear side of an image display screen and environmental light incident from a front side of the image display screen.

It is preferable that a hole is provided in a black matrix located above the image display side of the optical sensor to facilitate incidence of environmental light. In particular, a light transmitting member is preferably formed in the hole by thin film lamination. $SiO_2$ may be used as a material for an insulating film, because $SiO_2$ is a transparent material and enables electrical insulation between the upper and lower layers. Alternatively, a material used in one of the upper and lower layers may be filled into the hole.

The at least one optical sensor is preferably located in a non-display region.

If the optical sensor is thus located in the non-display region outside a display region of the image display screen, there is no influence on image display in the display region. In addition, the optical sensor is preferably a diode made of amorphous silicon or polycrystalline silicon. In particular, when the optical sensor is formed by laminating the thin film by polycrystalline silicon, a circuit density is increased. Accordingly, an area in which the optical sensor is formed can be decreased, so that there is no increase in the size as compared with a conventional liquid crystal panel.

Preferably, the image display device of the present invention further includes a backlight for the liquid crystal panel and control means for controlling the backlight and the control means turns off the backlight when environmental light (exterior light) is measured using the at least one optical sensor and turns on the backlight when light from the backlight is measured using the at least one optical sensor.

It is preferable to acquire in advance the relation between the maximum luminance of the liquid crystal panel (image display device, that is, image display therein) and the results of the measurement of light from the backlight in a darkroom, and the relation between the minimum luminance of the liquid crystal panel and the results of the measurement of light from the backlight in a darkroom, and detect the maximum luminance and the minimum luminance of the liquid crystal panel from the results of the measurement of light from the backlight using the optical sensor. It is further preferable to acquire in advance the relation between the surface reflection luminance of the liquid crystal panel and the results of the measurement of exterior light and detect the surface reflection luminance of the liquid crystal panel from the results of the measurement of environmental light (exterior light) using the optical sensor.

The image display device of the present invention is preferably a medical image display device for displaying a medical image on the liquid crystal panel.

According to the structure of the present invention, the optical sensor is formed by laminating thin film, that is to say, laminated on the same transparent substrate made of glass, a transparent resin, or the like together with the pixel electrodes and the switching elements. In particular, the optical sensor can be thin-film-laminated on the transparent substrate together with the pixel electrodes and the switching elements by the same steps. In other words, if a pattern for the optical sensor is incorporated in a pattern for the pixel electrodes and the switching elements, the optical sensor can be easily thin-film-laminated on the transparent substrate together with the pixel electrodes and the switching elements by repeating the steps such as resist formation, development, etching, and resist peeling.

Thus, according to the structure of the present invention, the amount of environmental light or the amount of light from a backlight can be measured without locating a separate optical sensor in the liquid crystal panel or using a separate luminance meter.

Also, because the optical sensor is incorporated in the transparent substrate, it is unnecessary to prepare for each measurement a specific measurement device such as a luminance meter. Therefore, the measurement is conducted in a real time, so that luminance unevenness can be compensated for. In addition, there can be provided a structure useful to reduce the size of the image display device on which the optical sensor for detecting the amount of environmental light (exterior light) and the amount of light from the backlight is mounted.

In particular, the image display device of the present invention is capable of easy measurement of environmental light and light from the backlight, which enables significant improvement of the workability for display quality control and particularly easy display quality control of medical images. Therefore, the image display device of the present invention is useful as the medical image display device.

Also, in particular, in the case of a direct type backlight in which a plurality of CCFLs are arranged, the optical sensor is located for each of the CCFLs, the measurement is conducted, and a current flowing into a CCFL whose luminance is reduced is controlled. Thus, a change with time with respect to the uniformity of luminance can be compensated for.

Note that the thin-film-laminated optical sensor detects the environmental light incident from the front side or the rear side of the liquid crystal panel and outputs a signal corresponding to the amount of light (for example, a current value, a voltage value, or a power value). The quantitative determination can preferably be conducted by a control section (CPU) provided separately from the liquid crystal panel. Alternatively, the control section may be formed by thin film lamination in the liquid crystal panel itself.

Further, according to the present invention, there is provided an image display system comprising image display devices each having display means for displaying on a monitor a measurement result obtained by the optical sensor or voice output means for outputting a voice indicating the measurement result.

Note that the image display system of the present invention is particularly useful as the medical image display system.

BRIEF DESCRIPTION OF THE DRAWINGS

In the accompanying drawings:

FIGS. 7A to 7C are explanatory views of another example in which the pn-junction is not used in the optical sensor mounted on the medical image display device of the present invention, in which

DESCRIPTION OF THE PREFERRED EMBODIMENT

Hereinafter, the image display device and the image display system using this device according to the present invention will be described in detail with reference to preferred embodiments shown in the accompanying drawings. A medical image display device and a medical image display system using this device will be described below as a typical case but it is to be understood that this is not the sole case of the present invention.

Figure 1:
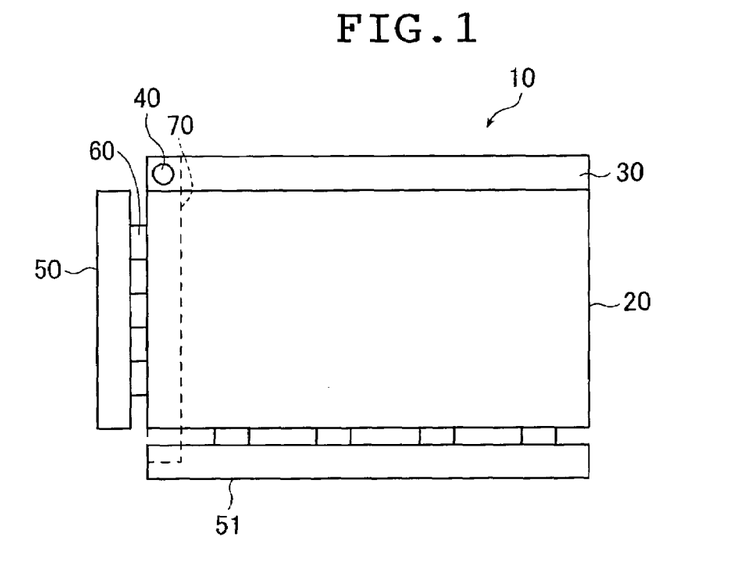
FIG. 1 is a plan view showing a main part structure of an example of a liquid crystal panel used for a medical image display device of the present invention.

FIG. 1 is a plan view showing a main part structure of an exemplary liquid crystal panel used for the medical image display device of the present invention. Reference numeral 10 denotes a liquid crystal panel. In the liquid crystal panel 10 shown in FIG. 1, an array substrate in which driver circuits for pixel electrodes and switching elements are formed is mainly indicated, and a counter substrate which is located opposite to the array substrate and in which a color filter and the like are formed is omitted.

The liquid crystal panel 10 includes: a display region 20 in which thin film transistors (TFTs), transparent pixel electrodes made of indium tin oxide (ITO), and a wiring pattern, which are not shown, are formed by thin film lamination on the array substrate made of flat glass; and a non-display region 30 provided outside the display region 20.

An optical sensor 40 is formed by the thin film lamination in the non-display region 30. The optical sensor 40 has a structure of a pn-junction using the same amorphous silicon (a-Si) as in the TFTs. The optical sensor 40 is an optical sensor utilizing a photovoltaic effect. According to the optical sensor 40, when the interface of the pn-junction is irradiated with light, a photoproduction carrier is produced. Then, an electron and hole which are generated are drifted in opposite directions to each other by an electric field to cause the separation of charges. Therefore, an electromotive force resulting from light reception is generated. Thus, the optical sensor 40 outputs the electromotive force as an electric signal.

Also, the liquid crystal panel 10 is electrically connected with a gate driver 50 for controlling the gates of the TFTs and a source driver 51 for controlling the signal level of a voltage applied to the liquid crystal panel 10 in accordance with image data of an image to be displayed through TABs 60. Similarly, the optical sensor 40 is electrically connected with a higher level unit through the TAB 60.

A backlight 70 for emitting light transmitting through pixel electrodes is located on the rear side of the liquid crystal panel 10. The optical sensor 40 is located near the backlight 70. In addition, a light guide plate for guiding light emitted from the backlight 70, which is not shown, is located on the rear surface of the display region 20.

Figure 2:
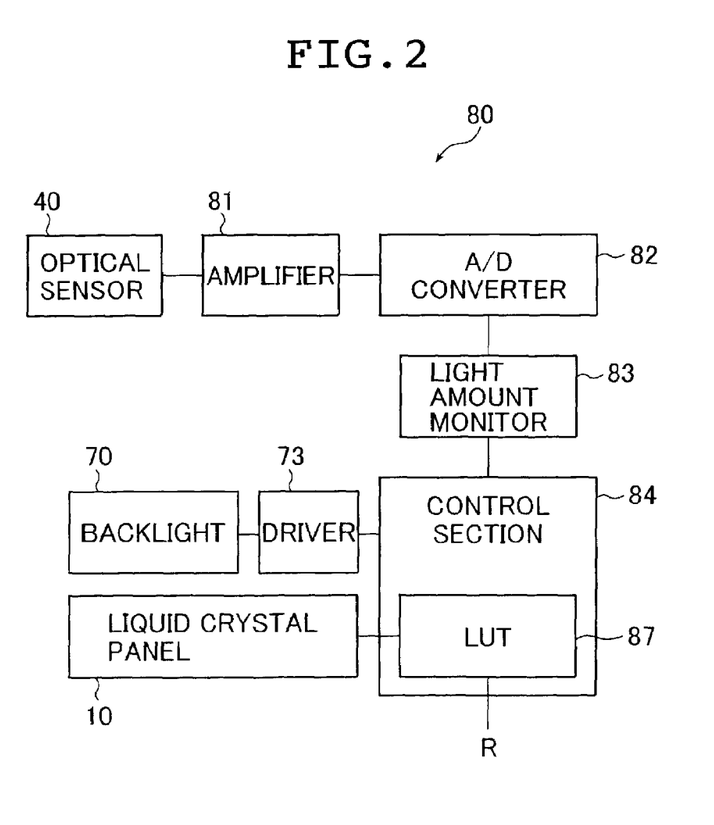
FIG. 2 is a block diagram showing an example of a main part structure for explaining optical measurement processing and display processing of a medical image display system of the present invention.

FIG. 2 is a block diagram showing a main part structure for explaining optical measurement processing and display processing of the medical image display system including the medical image display device of the present invention. Reference numeral 80 denotes a medical image display system. The medical image display system 80 includes the optical sensor 40, an amplifier 81 for amplifying a voltage value sent from the optical sensor 40, an A/D converter 82 for converting the voltage value sent from the amplifier 81 as an analog value into light amount data as a digital value, a light amount monitor 83 for monitoring the light amount data, a control section 84 for receiving a signal from the light amount monitor 83 to conduct the optical measurement processing and display processing, the backlight 70 controlled by the control section 84, and a backlight driver 73 located between the control section 84 and the backlight 70. Note that the control section 84 has a gradation correcting portion which receives an image data signal R from an exterior image data supply source (not shown) and corrects the luminance gradation of the liquid crystal panel 10, that is, a gradation correcting LUT (look-up table) 87. The gradation correction using the LUT 87 and the calibration thereof will be described later.

In other words, according to the medical image display system 80, when the optical sensor 40 receives environmental light or light from the backlight to generate an electromotive force, a voltage value (an electric signal) corresponding to the electromotive force is amplified by the amplifier 81 and the voltage value as the analog value is converted into the light amount data as the digital value by the A/D converter 82.

Then, when an abnormal state is caused while the light amount monitor 83 monitors the light amount data sent in real time, the light amount monitor 83 sends an abnormality signal to the control section 84 as a higher level unit. When receiving the abnormality signal, the control section 84 controls the gate driver 50 or the source driver 51 to display light amount abnormality of the environmental light (exterior light) or that of the backlight 70 on the liquid crystal panel 10, or to issue an alarm on the light amount abnormality from a speaker (not shown), or to perform both of the display and the issuance of an alarm on the light amount abnormality.

Note that, when the backlight 70 is a CCFL capable of adjusting luminance depending on current, the control section 84 may control the value of the current to be supplied to adjust the CCFL.

Figure 3A:
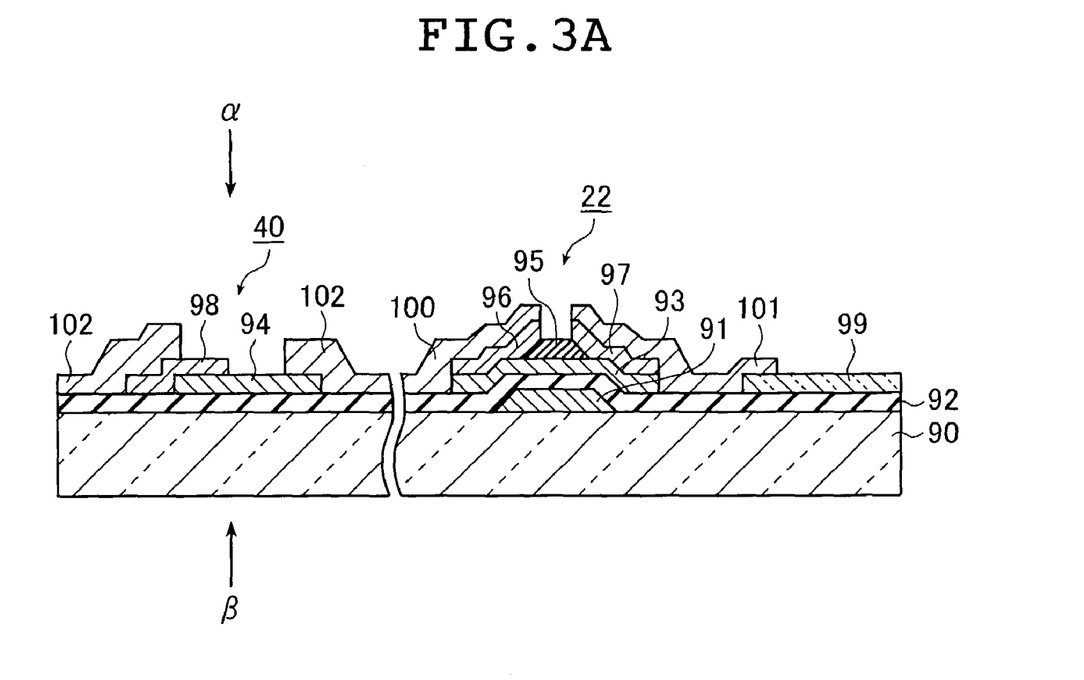
FIG. 3A is a sectional view for explaining a main part structure of an exemplary array substrate of the medical image display device of the present invention.

FIG. 3A is a sectional view for explaining a main part structure of an example of the array substrate of the medical image display device of the present invention. The array substrate has a structure in which the optical sensor 40 which is composed of an insulating film 92, a p-type a-Si film 94, an n-type a-Si film 98, and optical sensor electrodes 102, 102; pixel electrodes 99; and TFTs 22 each of which is composed of a gate electrode 91, the insulating film 92, a non-doped a-Si film 93, n-type a-Si films 96 and 97, a source electrode 100, and a drain electrode 101 are thin-film-laminated on a single transparent substrate 90. In particular, the optical sensor 40 and the TFTs 22 are made of the same material, a-Si. Note that, as the same material which composes the optical sensor 40 and the TFTs 22, polycrystalline silicon may be used instead of a-Si.

Although not shown, the optical sensor 40 and the TFTs 22 have a protective layer made of silicon nitride ($SiN_x$) formed thereon.

Also, it is possible that the insulating film 92 of the optical sensor 40 is omitted and the p-type a-Si film 94 is directly formed on the transparent substrate 90. In general, because $SiO_2$ is used for the insulating film 92 and the reflection is caused on its interface at incidence and exit of light, the amount of light entered into the optical sensor 40 is reduced. Therefore, when the p-type a-Si film is directly formed on the transparent substrate 90, it can be expected that the transmittance of light be increased as compared with the case where the insulating film 92 is interposed therebetween.

According to the optical sensor 40, the movement of carriers is produced at the bonded interface between the p-type a-Si film 94 and the n-type a-Si film 98, which results from both light from a direction indicated by an arrow α (environmental light) and light from a direction indicated by an arrow β (light from the backlight), thereby generating the electromotive force due to light irradiation. The generated electromotive force is led as an electric signal from the optical sensor electrodes 102, 102 to the outside.

Figure 3B:
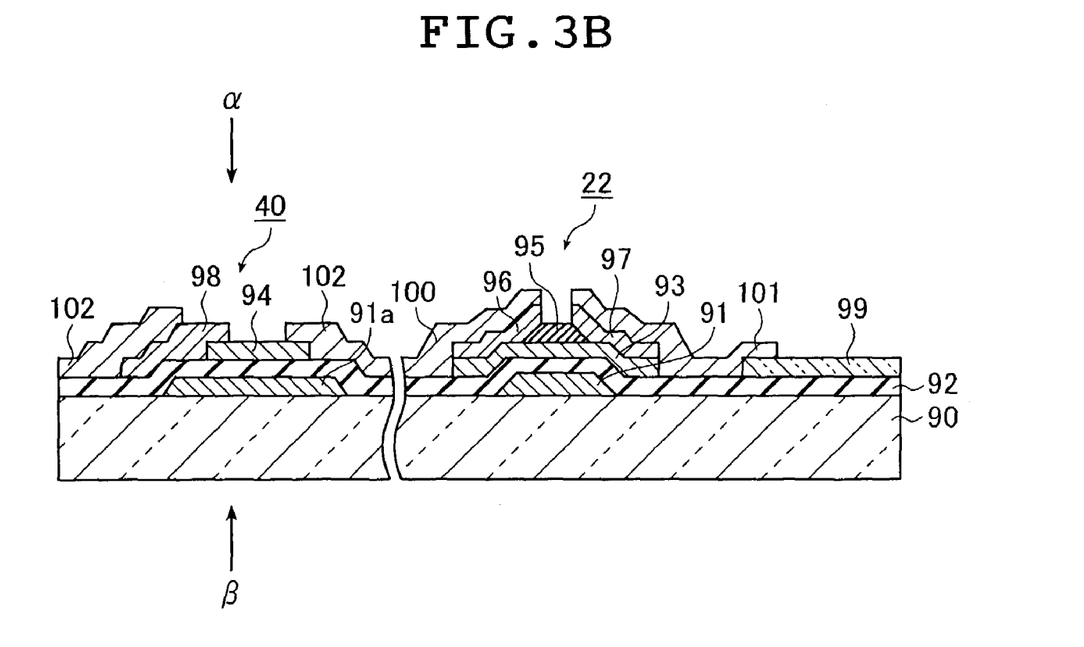
FIG. 3B is a sectional view for explaining a main part structure of another example.
Figure 4A:
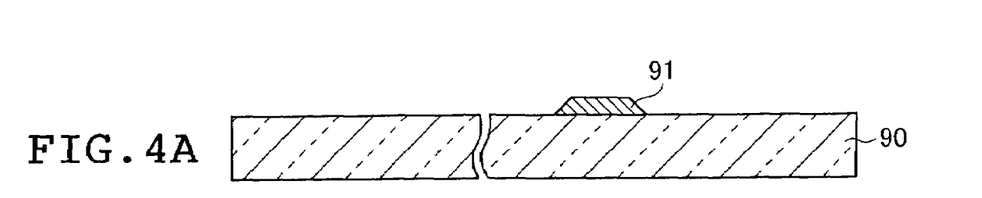
FIGS. 4A to 4D are explanatory step views for steps of manufacturing the array substrate shown in FIG. 3A, which are sectional views in the respective steps of manufacturing the array substrate.
Figure 4B:
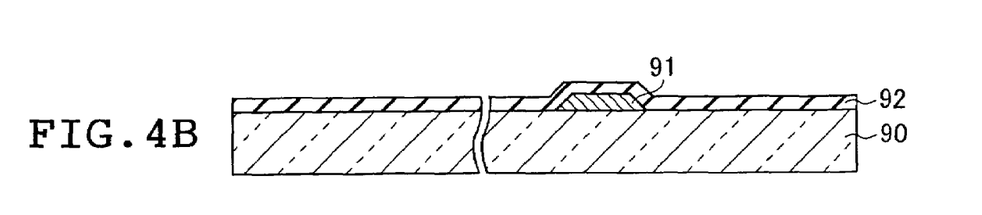
Figure 4C:
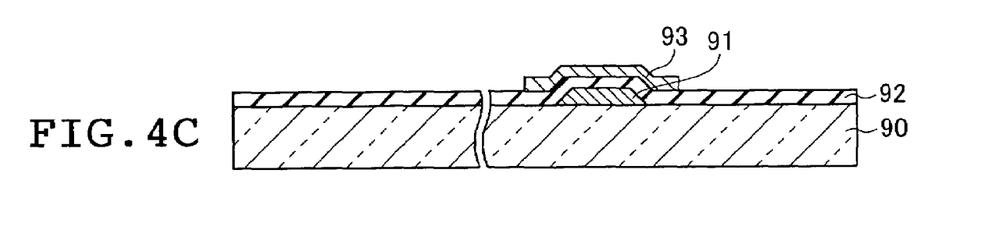
Figure 4D:
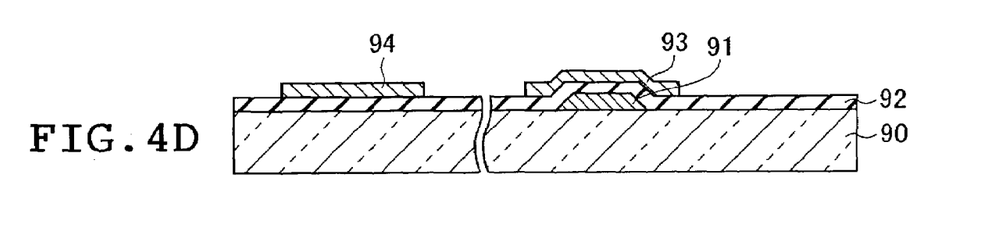

When it is desired to block out the light from the direction β (light from the backlight 70), in other words, when it is desired to measure only the environmental light (exterior light), a dummy electrode 91a for shielding need only be provided beneath the p-type a-Si film 94 between the transparent substrate 90 and the insulating film 92 as shown in FIG. 3B. The dummy electrode 91a for shielding can be formed on the transparent substrate 90 at the same time as the gate electrode 91.

FIGS. 4A to 4D and 5E to 5H are explanatory step views for steps of manufacturing the array substrate shown in FIG. 3A. For the array substrate, a series of steps such as metallic film formation, resist formation, masking, exposure, development, etching, and resist peeling are repeated, so that the optical sensor 40 is formed by thin film lamination together with the pixel electrodes 99 and the TFTs 22. First, the gate electrode 91 is formed on the transparent substrate (glass substrate) 90 (see FIG. 4A) and then the insulating film 92 is formed (see FIG. 4B).

Figure 5E:
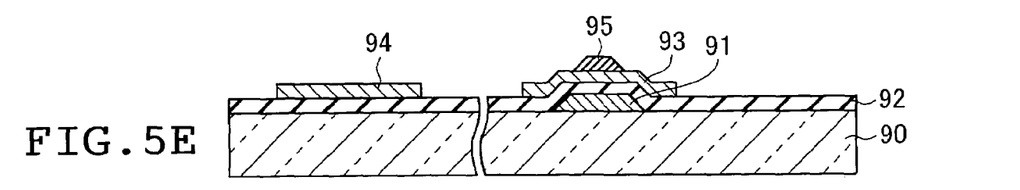
FIGS. 5E to 5H are explanatory step views for steps of manufacturing the array substrate shown in FIG. 3A, which are sectional views in the respective steps of manufacturing the array substrate.
Figures 5F, 5G, 5H:
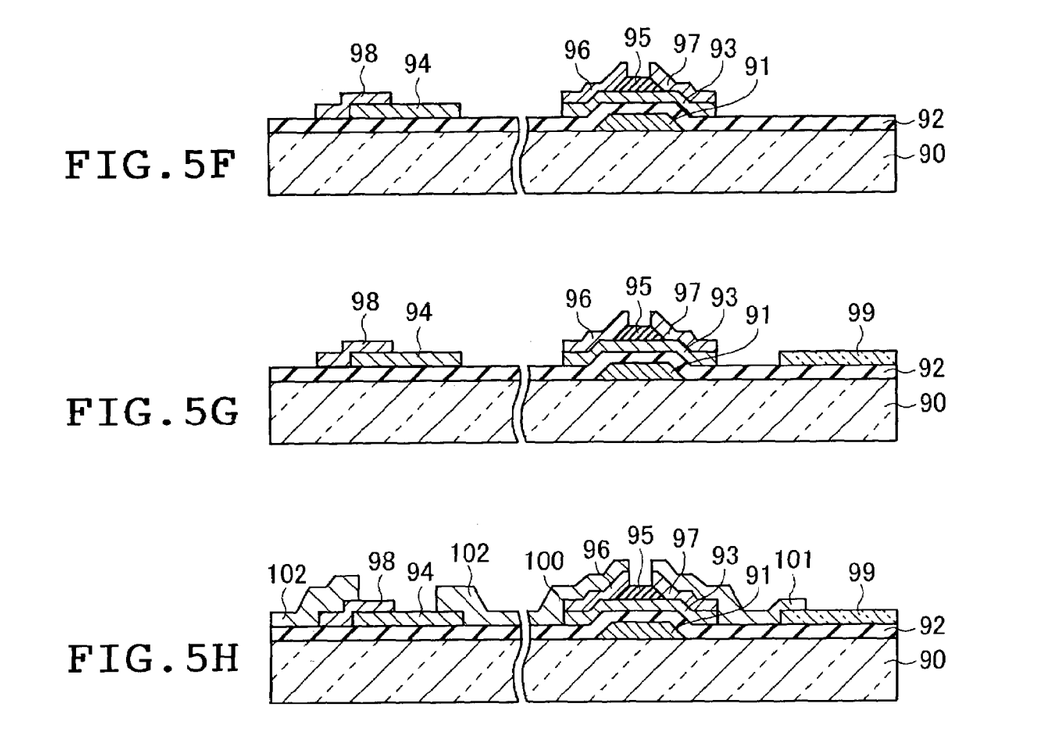

After that, the non-doped a-Si film 93 is formed (see FIG. 4C), the p-type a-Si film 94 doped with boron is formed (see FIG. 4D), an insulating film 95 is formed (see FIG. 5E), the n-type a-Si films 96, 97, and 98 doped with phosphorus are formed (see FIG. 5F), the pixel electrode 99 is formed (see FIG. 5G), and the source electrode 100, the drain electrode 101, and the optical sensor electrodes 102, 102 are then formed (see FIG. 5H). In this way, the optical sensor 40, the pixel electrodes 99, and the TFTs 22 are formed by the thin film lamination on the same transparent substrate 90.

Figure 6:
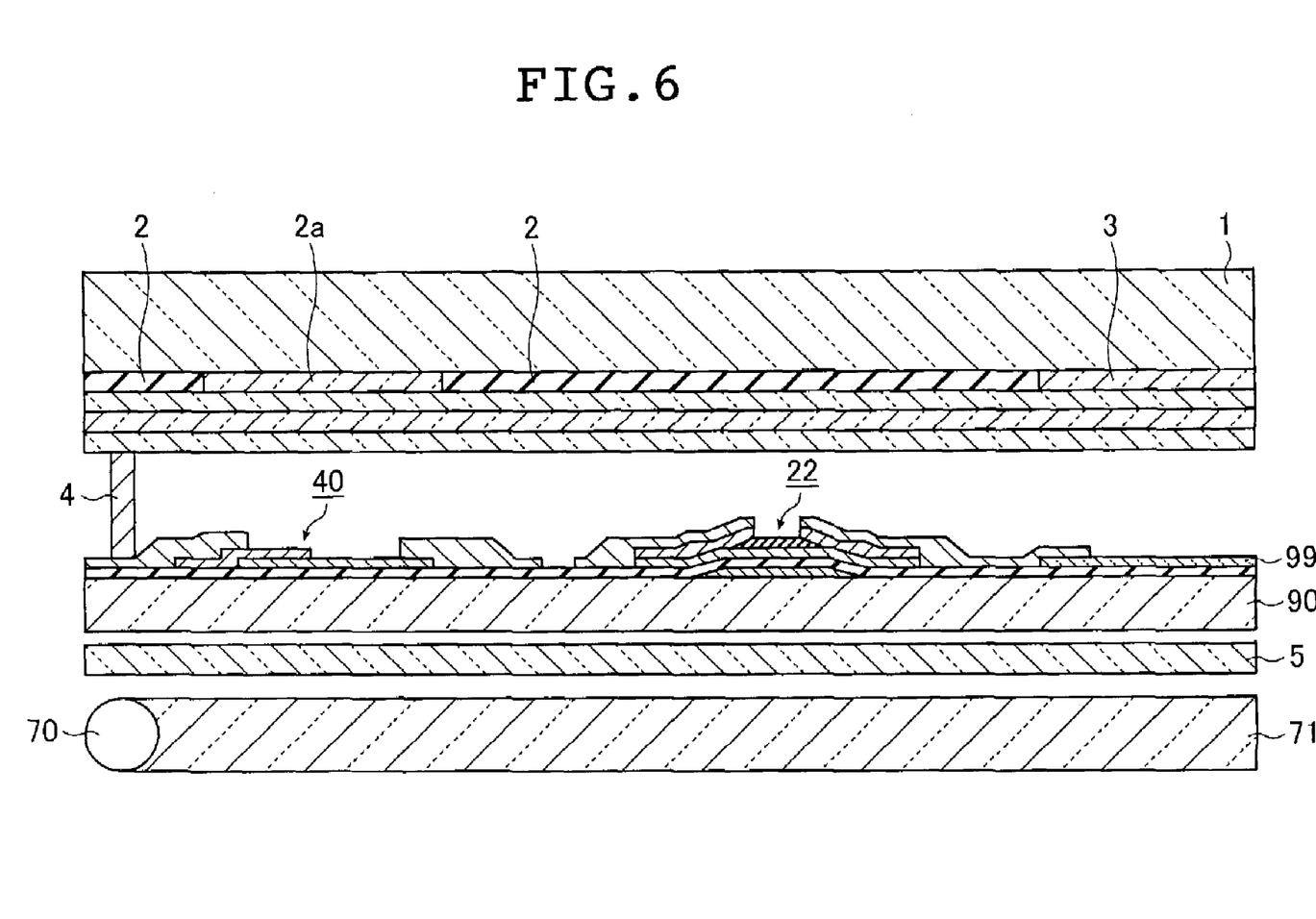
FIG. 6 is a schematic view showing a main part structure of the liquid crystal panel of the medical image display device according to the present invention.

FIG. 6 is a schematic view showing a main part structure of an example of the liquid crystal panel of the medical image display device according to the present invention. The liquid crystal panel has a structure in which the transparent substrate 90 in which the optical sensor 40, the TFTs 22, and the pixel electrodes 99 are formed by the thin film lamination and a transparent substrate 1 are bonded to each other by a sealing member 4. A liquid crystal and spacers, which are not shown, are sealed between the transparent substrate 90 and the transparent substrate 1. Note that, in FIG. 6, the backlight 70 for emitting light, a light guide plate 71 for guiding the light emitted from the backlight 70 onto substantially the entire surface of the transparent substrate 90, and a diffusion plate 5 for diffusing the light guided by the light guide plate 71 to reduce the luminance unevenness, thereby making the light enter into the transparent substrate 90 side are disposed under the transparent substrate 90.

A black matrix 2 for shielding the upper portion of the TFT 22 from light and a color filter 3 located above the pixel electrode 99 are mainly laminated on the transparent substrate 1. A window hole 2a for the admission of external environmental light is formed in the black matrix 2 above the optical sensor 40. Note that a single layer film made of metallic chromium, a composite film made of metallic chromium and chromium oxide, or a resin film into which carbon is incorporated is very often used for the black matrix 2. In addition, it is preferable that the window hole 2a formed in the black matrix 2 is filled with a transparent insulating material such as $SiO_2$.

Note that a region of the optical sensor 40 may be located outside the sealing member 4. In the case of such a structure, the window hole 2a for the admission of environmental light (exterior light) is not necessarily formed. In addition, it is preferable that the window hole 2a is not formed in the structure in which light from the backlight 70 is measured. When environmental light and light from the backlight 70 are measured separately, the optical sensor 40 in which the window hole 2a for the admission of environmental light is formed and the optical sensor 40 in which the window hole 2a is not formed for measuring light from the backlight 70 are provided in separate portions.

The case where the number of optical sensors is one has been described above, but it is preferable that a plurality of optical sensors are arranged to further improve the sensitivity. In addition, it is preferable that a plurality of optical sensors for measuring environmental light and a plurality of optical sensors for measuring the amount of light from the backlight are separately arranged.

Figure 7A:
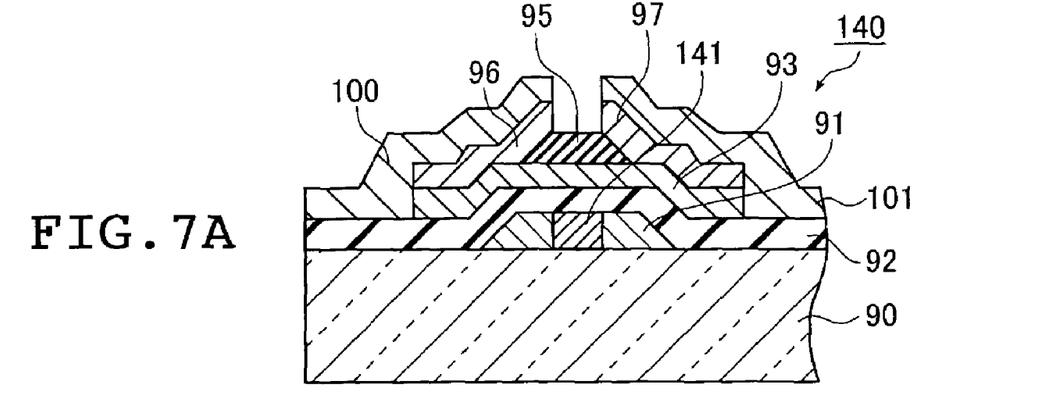
FIG. 7A is a sectional view of the optical sensor.
Figure 7B:
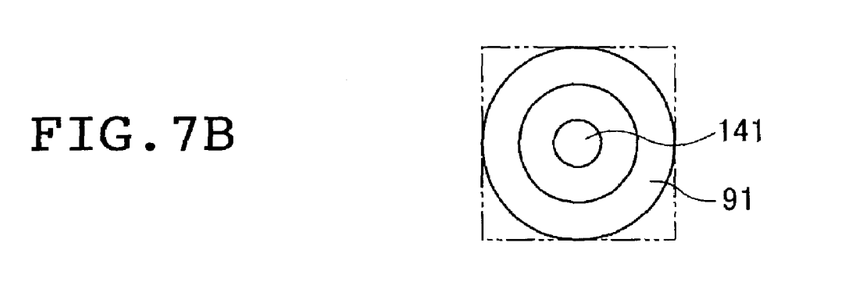
FIG. 7B is a plan view of a gate electrode.
Figure 7C:
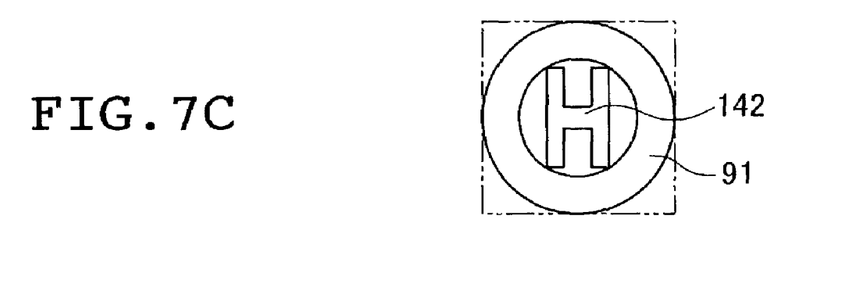
FIG. 7C is a plan view of a gate electrode as another example.

FIGS. 7A to 7C are explanatory views of another example in which the pn-junction is not used in an optical sensor mounted on the medical image display device of the present invention. FIG. 7A is a sectional view of the optical sensor, FIG. 7B is a plan view of a gate electrode, and FIG. 7C is a plan view of a gate electrode as another example. In FIG. 7A, reference numeral 140 denotes an optical sensor. The optical sensor 140 has a structure in which the gate electrode 91, the insulating film 92, the non-doped a-Si film 93, the n-type a-Si films 96 and 97, the source electrode 100, the drain electrode 101, and a transparent member 141 with which a hole formed in the gate electrode 91 is filled are thin-film-laminated on the transparent substrate 90.

As is apparent from the same reference numerals given to the elements having the same structure as in the TFT 22, whether or not the transparent member 141 is provided in the gate electrode 91 is the difference between the TFT 22 and the optical sensor 140. The transparent member 141 has a function of transmitting light of the backlight 70 (not shown here) from the transparent substrate 90 side to the a-Si film 93. Accordingly, an electromotive force resulting from a leak current due to light irradiation is generated and output as an electric signal in the a-Si film 93 without making the pn-junction, so that the characteristic of the optical sensor 140 can be utilized while the structure of the TFT 22 is kept.

Also, the transparent member 141 may be formed, for example, concentrically with respect to the circular gate electrode 91 as shown in FIG. 7B. Note that, as shown in FIG. 7C, an H-shaped transparent member 142 may be formed in the gate electrode 91. Exemplary shapes of the transparent members 141 and 142 were mentioned above, but the present invention is not limited to these shapes. As shown by chain double-dashed lines in FIGS. 7B and 7C, the gate electrode 91 may be of a rectangular shape or other shapes.

Note that, in consideration of the transparent member 141 which is a thin film, lamination is preferably made using for example $SiO_2$.

The optical measurement processing and display processing in the medical image display system 80 of the present invention shown in FIG. 2 which includes the medical image display device using the liquid crystal panel 10 shown in FIG. 1, in particular the gradation correction using the gradation correcting LUT (gradation correcting portion) 87 for correcting the luminance gradation of the liquid crystal panel 10 and the calibration of the LUT 87 will be described below.

In the illustrated medical image display system 80, image data R of an image displayed on the liquid crystal panel 10 is supplied from an exterior image data supply source (not shown) to the control section 84 and then to the LUT (gradation correcting portion) 87.

The LUT (gradation correcting portion) 87 is a block in which the supplied image data R is corrected using the gradation correcting LUT prepared (updated) by the calibration (of the luminance gradation) to produce image data corresponding to an image having specified (luminance) gradation properties.

In the illustrated case, the LUT 87 corrects the supplied image data R so that the displayed image can be an image having gradation properties corresponding to the DICOM GSDF (Grayscale Standard Display Function).

The image data corrected by the LUT 87 is then supplied to an LCD driver of the liquid crystal panel 10.

The LCD driver includes the gate driver 50 and the source driver 51 and converts the image data supplied from the LUT 87 into a drive signal corresponding to the liquid crystal panel 10 and sends the drive signal to the gate driver 50 and the source driver 51 to drive a corresponding TFT 22 of the liquid crystal panel 10.

In the illustrated medical image display system 80, environmental light (hereinafter referred to as exterior light) is measured to detect the surface reflection luminance of the liquid crystal panel 10 (image view surface) or light from the backlight 70 is measured to detect the maximum luminance and the minimum luminance of the liquid crystal panel 10, both according to the optical measurement processing as described above.

The image display device and system, and the method for the optical measurement processing according to the present invention will described below in greater detail by explaining the detection of the surface reflection luminance based on the measurement of exterior light, the detection of the maximum luminance and minimum luminance based on the measurement of light from the backlight 70, and the operations of the control section 84 and the LUT 87 during the luminance detection.

A telescopic luminance meter and an illuminometer are used to determine in advance the relation between the illuminance E [lx] of exterior light incident on the liquid crystal panel 10 and the surface reflection luminance $L_{amb}$ [cd/m$^2$], and the relation between the illuminance E and the output signal x (digital data) from the optical sensor 40 (see FIG. 6) thereby detecting the surface reflection luminance based on the measurement of exterior light.

When the relation between the illuminance E and the surface reflection luminance $L_{amb}$ is determined, the control section 84 activates the LCD driver (gate driver 50 and source driver 51) and the backlight driver 73 (hereinafter the operation of the control section 84 will be omitted) to render the liquid crystal panel 10 in black display state (in which the whole area of the display region (effective pixel region) 20 in the liquid crystal panel 10 has the minimum luminance or a minimum amount of light passes through liquid crystal). The backlight is turned off. The illuminometer is placed on the surface of the liquid crystal panel 10 to measure the illuminance E of exterior light on the surface of the liquid crystal panel 10, and the surface reflection luminance $L_{amb}$ of the liquid crystal panel 10 at the time of the illuminance measurement is also measured with the telescopic luminance meter. The measurement is repeatedly performed in illumination with various amounts of light to thereby determine the relation between the illuminance E and the surface reflection luminance $L_{amb}$.

A diffuse reflection coefficient ρ is used to represent the above relation by "$L_{amb}=\rho E$". In other words, the surface reflection luminance $L_{amb}$ is increased proportionately with the illuminance E.

On the other hand, when the relation between the illuminance E and the output signal x from the optical sensor 40 is determined, the backlight is turned off, the illuminance E on the surface of the liquid crystal panel 10 is measured in the same manner and the amount of exterior light at the time of the illuminance measurement is also measured with the optical sensor 40. The measurement is repeatedly performed in illumination with various amounts of light to determine the relation between the illuminance E and the output signal x from the optical sensor 40.

As described above, when the backlight is turned off, the output signal x from the optical sensor 40 is increased proportionately with the amount of exterior light incident on the liquid crystal panel 10, that is, the illuminance E. The relation between the illuminance E of exterior light and the output signal x is represented by "$x=k_1 E$" wherein $k_1$ is a constant of proportionality.

The surface reflection luminance $L_{amb}$ is represented by "$L_{amb}=\rho E$" and is increased proportionately with the illuminance E of exterior light. The output signal x from the optical sensor is also increased proportionately with the illuminance E of exterior light based on the equation "$x=k_1 E$". Therefore, the surface reflection luminance $L_{amb}$ has a proportional relation with the output signal x from the optical sensor 40.

To be more specific, the following equation is derived:

$$E = x/k_1 = L_{amb}/\rho$$

Then, $$x = L_{amb} k_1/\rho$$

Therefore, $$L_{amb} = (\rho/k_1) x$$

Figure 8A:
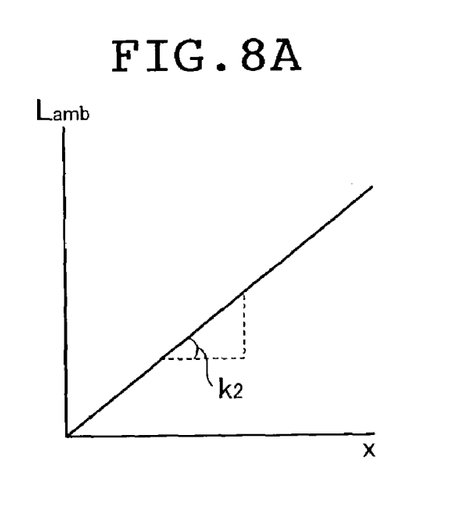
FIG. 8A is a graph for explaining detection of surface reflection luminance in the present invention.

Assuming that $(\rho/k_1)$ is $k_2$, the equation of the graph as shown in FIG. 8A:

$$L_{amb} = k_2 x$$

is obtained.

Therefore, by determining the relation shown in FIG. 8A and the constant of proportionality $k_2$ (hereinafter referred to as reflection luminance coefficient $k_2$) in advance and measuring exterior light using the optical sensor 40 while the backlight is turned off, the surface reflection luminance $L_{amb}$ can be detected from the measurement results, that is, the output signal x from the optical sensor 40.

On the other hand, in order to detect the maximum luminance and the minimum luminance of the liquid crystal panel 10 based on the measurement of light from the backlight 70 with the optical sensor 40 covered with the black matrix 2 having no window hole 2a as described above, the telescopic luminance meter is used to determine in advance the relation between the maximum luminance and minimum luminance, and the results of the measurement of light from the backlight 70 with the optical sensor 40.

When this relation is determined, the output signal y from the optical sensor 40 is measured in a darkroom while the backlight 70 is turned on and the display luminance of the liquid crystal panel 10 under the action of the luminance of the backlight is measured with the telescopic luminance meter in black display state (minimum luminance $L_{min}$) and in white display state (maximum luminance $L_{max}$). The white display state refers to the state in which the whole area of the display region (effective pixel region) 20 in the liquid crystal panel 10 has the maximum luminance or a maximum amount of light passes through liquid crystal. The measurement is repeatedly performed with various backlight luminance values (various outputs from the backlight 70) to thereby determine the relation between the output signal y from the optical sensor 40, and the maximum luminance $L_{max}$ and minimum luminance $L_{min}$.

If there is no aging in the medical image display device (liquid crystal panel 10), the maximum luminance $L_{max}$ and the minimum luminance $L_{min}$ of the liquid crystal panel 10 are proportional to the luminance of the backlight 70, that is, the output signal y of the optical sensor 40. In other words, the equations "$L_{max}=ay$" and "$L_{min}=by$" are obtained where a is a constant of proportionality between the maximum luminance $L_{max}$ and the output signal y, and b is a constant of proportionality between the minimum luminance $L_{min}$ and the output signal y.

Figure 8B:
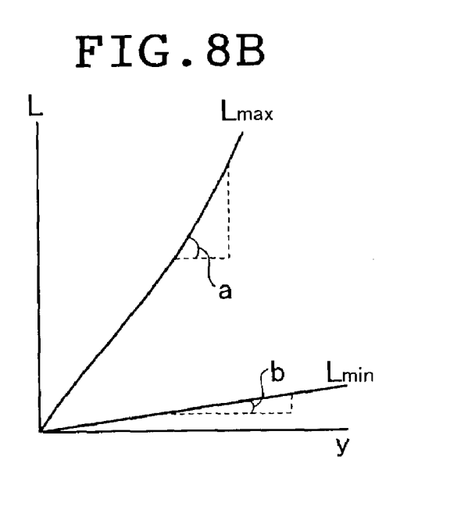
FIG. 8B is a graph for explaining detection of maximum luminance and minimum luminance in the present invention.

Therefore, by determining in advance the relation shown in FIG. 8B, the constant of proportionality a (hereinafter referred to as maximum luminance coefficient a) and the constant of proportionality b (hereinafter referred to as minimum luminance coefficient b), and measuring light from the backlight 70 with the optical sensor 40 while the liquid crystal panel 10 is in black display state and the backlight 70 is turned on, the maximum luminance $L_{max}$ and the minimum luminance $L_{min}$ of the liquid crystal panel 10 can be detected from the measurement results, that is, the output signal y from the optical sensor 40.

The control section 84 in the medical image display device (liquid crystal panel 10) stores the reflection luminance coefficient $k_2$, the maximum luminance coefficient a and the minimum luminance coefficient b calculated as described above.

In accordance with an instruction entered from the exterior, the control section 84 turns off the backlight 70 to measure exterior light with the optical sensor 40 and detect the surface reflection luminance $L_{amb}$ of the liquid crystal panel 10 (medical image display device) using the output signal x and the reflection luminance coefficient $k_2$, or renders the liquid crystal panel 10 in black display state and turns on the backlight 70 to measure light from the backlight 70 with the optical sensor 40, and detect the maximum luminance $L_{max}$ and the minimum luminance $L_{min}$ of the liquid crystal panel 10 using the output signal y, and the maximum luminance coefficient a and the minimum luminance coefficient b.

In other words, according to the present invention, the surface reflection luminance of the liquid crystal panel 10, and the maximum luminance and the minimum luminance of the liquid crystal panel 10 can be detected without using a telescopic luminance meter or the like by measuring environmental light (exterior light) and light from the backlight 70. Therefore, the quality control of the liquid crystal panel 10 (medical image display device) can be readily performed by a simple operation.

When performing the calibration (for the luminance gradation) in the medical image display system 80, the control section 84 detects the surface reflection luminance $L_{amb}$ of the liquid crystal panel 10, and the maximum luminance $L_{max}$ and the minimum luminance $L_{min}$ of the liquid crystal panel 10 as described above to thereby update the gradation correcting LUT 87 in the gradation correcting portion. Since the medical image display device displays an image conforming to the DICOM GDSF gradation as described above, the control section 84 calculates the luminance range of from $L_{min}'$ to $L_{max}'$ in the liquid crystal panel 10 (medical image display device) by the following equations:

$$L_{max}'=L_{max}+L_{amb}$$

$$L_{min}'=L_{min}+L_{amb}.$$

The gradation assignment is performed so as to provide the GSDF gradation in this luminance range and the gradation correcting LUT 87 in the gradation correcting portion is updated, thereby performing the calibration. The gradation assignment or the like can be performed by any known method.

In other words, according to the present invention, the medical image display device can be calibrated by a simple operation without using a telescopic luminance meter or the like.

In the examples described above, the coefficients (functions) were used to detect the surface reflection luminance of the liquid crystal panel 10, and the maximum luminance and the minimum luminance of the liquid crystal panel 10. However, this is not the sole case of the present invention. An LUT prepared by performing the similar measurement may be used to detect the surface reflection luminance or the like.

Figure 9:
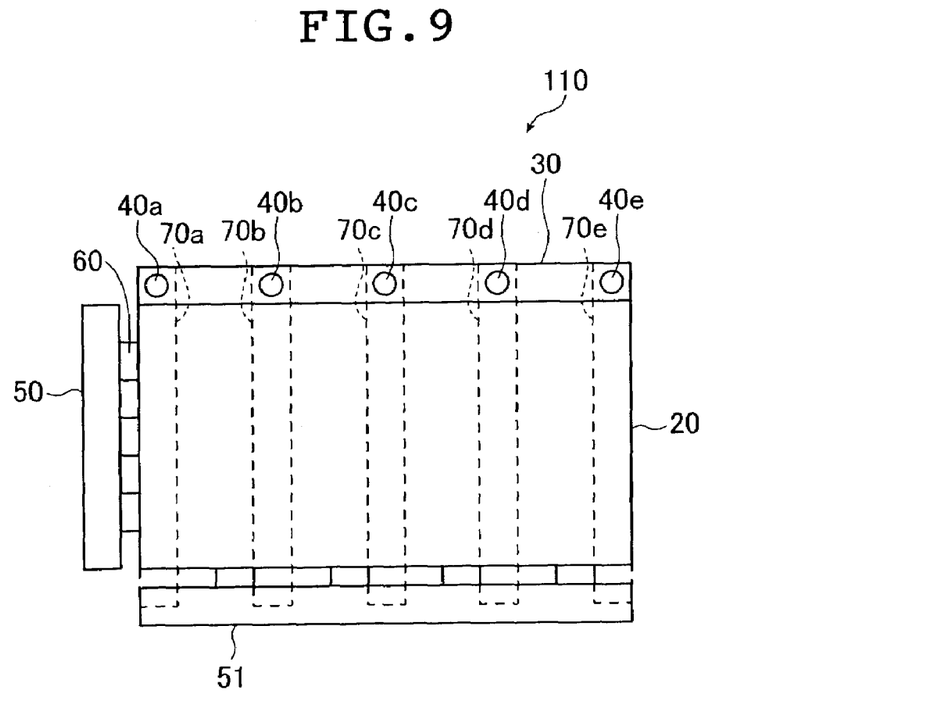
FIG. 9 is a plan view showing a main part structure of a liquid crystal panel as another example used for the medical image display device of the present invention.

FIG. 9 is a plan view showing a main part structure of a liquid crystal panel as another example used for the medical image display device of the present invention. Reference numeral 110 denotes a liquid crystal panel. In the liquid crystal panel 110 shown in FIG. 9, an array substrate in which driver circuits for pixel electrodes and switching elements are formed is mainly indicated, and a counter substrate which is located opposite to the array substrate and in which a color filter and the like are formed is omitted.

The liquid crystal panel 110 includes: a display region 20 in which thin film transistors (TFTs), transparent pixel electrodes made of ITO, and a wiring pattern, which are not shown, thin-film-laminated on the array substrate made of flat glass; and a non-display region 30 provided outside the display region 20.

Optical sensors 40*a*, 40*b*, 40*c*, 40*d*, and 40*e* similar to the optical sensor 40 described above are thin-film-laminated in the non-display region 30. In addition, the liquid crystal panel 110 is electrically connected with a gate driver 50 and a source driver 51 through TABs 60. Similarly, the optical sensors 40*a*, 40*b*, 40*c*, 40*d*, and 40*e* are electrically connected with a higher level unit through the TABs 60.

Backlights 70*a*, 70*b*, 70*c*, 70*d*, and 70*e* for emitting light to be transmitted through pixel electrodes are located in the rear side of the liquid crystal panel 110. The backlights 70*a*, 70*b*, 70*c*, 70*d*, and 70*e* are located near the optical sensors 40*a*, 40*b*, 40*c*, 40*d*, and 40*e*, respectively.

Figure 10:
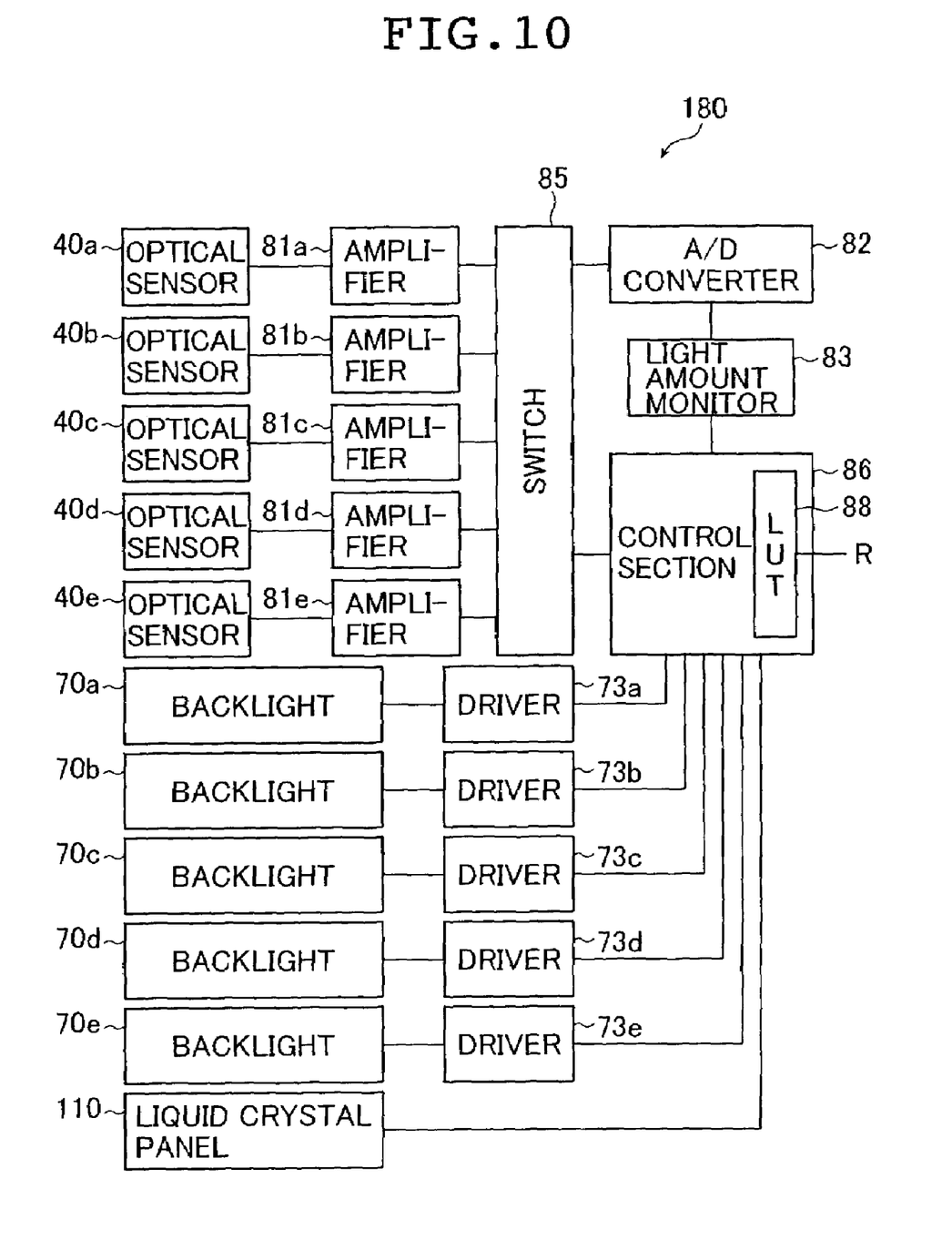
FIG. 10 is a block diagram showing a main part structure for explaining optical measurement processing of the medical image display system of the present invention.

FIG. 10 is a block diagram showing an example of a main part structure for explaining optical measurement processing and display processing of the medical image display system (device) of the present invention. Reference numeral 180 denotes a medical image display system. The medical image display system 180 includes: the optical sensors 40*a*, 40*b*, 40*c*, 40*d*, and 40*e*; amplifiers 81*a*, 81*b*, 81*c*, 81*d*, and 81*e* for amplifying respective voltage values sent from the optical sensors 40*a*, 40*b*, 40*c*, 40*d*, and 40*e*; a switch 85 for selectively outputting the voltage values inputted from the amplifiers 81*a*, 81*b*, 81*c*, 81*d*, and 81*e*; an A/D converter 82 for converting a voltage value as an analog value which is sent from the switch 85 into light amount data as a digital value; a light amount monitor 83 for monitoring the light amount data; a control section 86 which receives a signal from the light amount monitor 83 and conducts the optical measurement processing and display processing; the five backlights 70*a* to 70*e* controlled by the control section 86; and backlight drivers 73*a* to 73*e* provided between the control section 86 and the backlights 70*a* to 70*e*.

Note that the control section 86 also controls switching operation of the switch 85. Further, the control section 86 has a gradation correcting LUT (gradation correcting portion) 88 which receives an image data signal R from an exterior image data supply source (not shown) and corrects the luminance gradation of the liquid crystal panel 110. The gradation correction using the LUT 88 of the control section 86 and the calibration of the LUT 88 can be performed in the same manner as the gradation correction using the LUT 87 of the control section 84 and the calibration of the LUT 87.

According to the medical image display system 180, the switch 85 switches the outputs from the optical sensors 40*a*, 40*b*, 40*c*, 40*d*, and 40*e*, and the control section 86 checks the signal from the light amount monitor 83. Note that the description related to the same measurement operation as in the above description by reference to FIG. 2 is omitted. When receiving the abnormality signal, the control section 86 controls the gate driver 50 or the source driver 51 to display the light amount abnormality of the environmental light (exterior light) or that of the backlights 70*a*, 70*b*, 70*c*, 70*d*, and 70*e* on the liquid crystal panel 10, or to issue an alarm on the light amount abnormality from a speaker (not shown), or to perform both of the display and the issuance of an alarm on the light amount abnormality. Further, the control section 86 determines which of the backlights 70*a*, 70*b*, 70*c*, 70*d*, and

70e is abnormal. In the case of the CCFL, the value for a current supplied to the abnormal backlight 70a, 70b, 70c, 70d or 70e may be controlled to conduct luminance adjustment.

Thus, the image display apparatus of the present invention and in particular the medical image display apparatus and system, and the method for the optical measurement processing have been described in detail. However, the present invention is not limited to the above embodiments. As a matter of course, various improvements and modifications may be made without departing from the spirit and scope of the present invention.

For example, according to the above embodiments, the medical image display system includes one optical sensor or five optical sensors. However, the present invention is not limited to such embodiments. The medical image display system may include two optical sensors, three optical sensors, or four optical sensors. Alternatively, the medical image display system may include six or more optical sensors.

The embodiments described above referred to the case where the number of the liquid crystal panels 10 is one. However, it is preferable that an optical sensor is provided for each of a plurality of liquid crystal panels, the luminance of backlight in each liquid crystal panel is measured, and adjustment is conducted such that the luminance of each liquid crystal panel is uniform. The liquid crystal panels can be used for the electronic film viewers as shown in FIGS. 11 and 12, for example.

Figure 11:
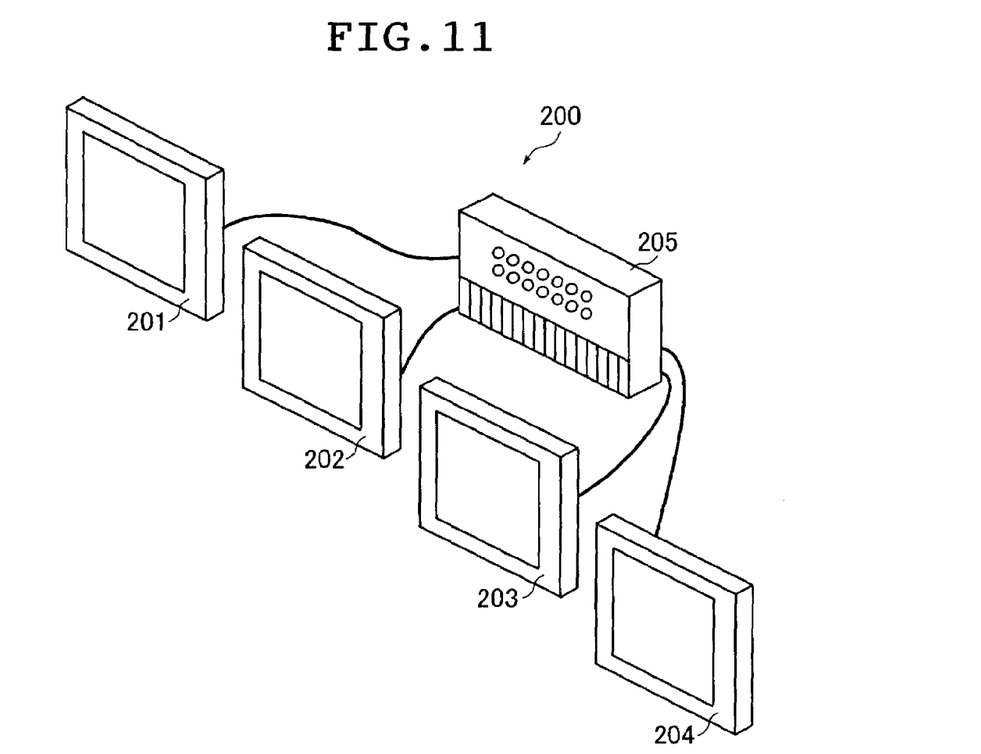
FIG. 11 is an explanatory view of an example of an electronic film viewer using the medical image display device of the present invention.

FIG. 11 shows an example of an electronic film viewer using the medical image display device according to the present invention. In an electronic film viewer 200, a control device 205 controls liquid crystal displays 201, 202, 203, and 204 in which the above-mentioned liquid crystal panel according to the present invention is incorporated.

Figure 12:
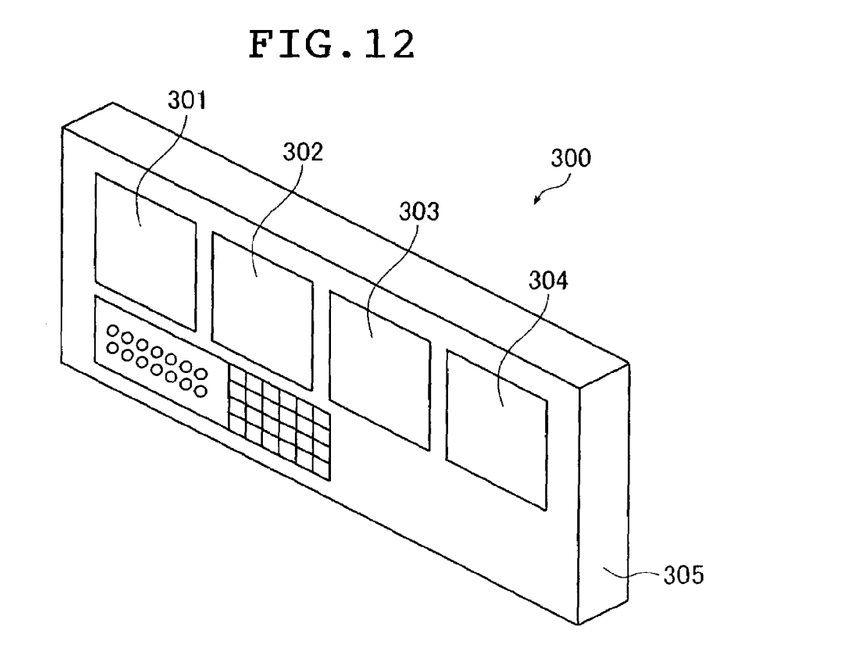
FIG. 12 is an explanatory view of another example of the electronic film viewer using the medical image display device of the present invention.

FIG. 12 shows another example of an electronic film viewer using the medical image display device according to the present invention. An electronic film viewer 300 has a structure in which liquid crystal displays 301, 302, 303, and 304 in which the above-mentioned liquid crystal panel according to the present invention is incorporated are incorporated in a case in which a control device 305 is integrally formed.

In the embodiments shown in FIGS. 2 and 10, the gradation correcting LUTs (gradation correcting portions) 87 and 88 for correcting the luminance gradation of the liquid crystal panels 10 and 110 are located in the control sections 84 and 86, respectively. However, this is not the sole case of the present invention. The gradation correcting LUT (gradation correcting portion) may be provided in the control device 205 or 305 shown in FIG. 11 or 12 so that the gradation correction using the LUT and the calibration of the LUT can be performed.

The embodiments described above referred to an active matrix liquid crystal panel of TFT system. However, a structure called MIM (metal insulator metal) system which is suitable to increase a circuit density may be used. This is a structure in which a thin-film-laminated switching element made from metal-insulator-metal (MIM) is formed instead of the switching element of TFT system. In this case, an optical sensor made of a-Si or the like is thin-film-laminated outside the non-display region of the panel. Therefore, the optical sensor may be formed before or after the formation of MIM. If one is being thin-film-laminated, the other is preferably masked.

Note that, in the above embodiments, the amounts of light from the respective light emitting tubes may be quantitatively measured by the optical sensor 40 and the control section 84 or 86 may inform of their states.

Furthermore, in the above embodiments, light amount adjusting means for adjusting the amount of light from the backlight (CCFL) 70 may be provided in the control section 84 or 86, and the amount of light may be adjusted to compensate for the luminance unevenness. The light amount adjusting means can be realized by using a program having a plurality of steps for adjusting the amount of light, a recording medium such as a ROM or a RAM into which the program is written, and a CPU for reading the program from the recording medium and executing the read program.

The programs considered are, for example, a program having a step of comparing the outputs of a plurality of optical sensors and a step of controlling ramp currents of the respective optical sensors based on the comparison result such that the outputs of the respective optical sensors coincide with one other, and a program having a step of setting a threshold value for the outputs of optical sensors in advance and comparing the threshold value with the outputs of the respective optical sensors and a step of controlling ramp currents based on the comparison result such that the output from the optical sensor which is lower than the threshold value becomes a value exceeding the threshold value (value equal to the threshold value or an arbitrary value exceeding the threshold value). However, the present invention is not limited to such programs.

Thus, as described above, according to the present invention, the optical sensor(s) for sensing the amount of environmental light and the amount of light from the backlight, the pixel electrodes, and the switching elements are provided on the same transparent substrate. Accordingly, the medical image display device which can achieve down sizing without preventing the optical sensor from obstructing screen view can be provided.

Therefore, it is not necessary to prepare a specific measurement device such as a luminance meter for each measurement as in a conventional case. Accordingly, the measurement is conducted in real time, so that luminance unevenness can be compensated for. In addition, particularly, if the optical sensor is formed on the transparent substrate together with the pixel electrodes and the switching elements using the same material, thin film lamination can be easily made without greatly increasing the number of steps. Thus, the medical image display device on which the optical sensor is mounted can be provided at low costs.

According to the present invention, the surface reflection luminance, maximum luminance, and minimum luminance can be measured simply without using any exterior luminance meter such as a telescopic luminance meter, which enables significant improvement of the workability for the display quality control.

What is claimed is:

1. An image display device which includes a liquid crystal panel, said liquid crystal panel comprising:
   at least one optical sensor for outputting an electric signal resulting from light irradiation;
   pixel electrodes for driving a liquid crystal;
   switching elements for switching the pixel electrodes; and
   a single transparent substrate on which said at least one optical sensor, said pixel electrodes and said switching elements are formed by laminating thin films,
   wherein said at least one optical sensor is disposed at a front side of the single transparent substrate,
   wherein said at least one optical sensor comprises a first optical sensor which receives and detects light which comes from a backlight located at a rear side of the single transparent substrate, the received light being transmitted without reflection through the single transparent substrate from the rear side to the front side of the single transparent substrate to be incident without reflection on said first optical sensor, and wherein said at least one optical sensor further comprises a second optical sensor which receives and detects exterior light being incident from a front side of said liquid crystal panel on said second optical sensor.

2. The image display device according to claim 1, wherein said first optical sensor and said second optical sensor are composed of a single optical sensor.

3. An image display device comprising:
a backlight; and
a liquid crystal panel, said liquid crystal panel comprising:
   at least one optical sensor;
   pixel electrodes for driving a liquid crystal;
   switching elements for switching the pixel electrodes; and
   a single transparent substrate on which said at least the one optical sensor, said
pixel electrodes and said switching elements are formed by laminating thin films,
wherein said backlight is located at a rear side of the single transparent substrate, wherein said at least one optical sensor is disposed at a front side of the single transparent substrate, wherein said at least one optical sensor comprises a first optical sensor which receives and detects light which comes from the backlight, the received light traveling without reflection through the single transparent substrate from the rear side to the front side of the single transparent substrate to be incident without reflection from the rear side on said first optical sensor, and wherein said at least one optical sensor further comprises a second optical sensor which receives and detects exterior light being incident from a front side of said liquid crystal panel on said second optical sensor.

4. The image display device according to claim 3, wherein said first optical sensor and said second optical sensor are composed of a single optical sensor.

* * * * *